US011854167B2

(12) United States Patent
Gordon et al.

(10) Patent No.: US 11,854,167 B2
(45) Date of Patent: Dec. 26, 2023

(54) PHOTOGRAPHIC UNDEREXPOSURE CORRECTION USING A NEURAL NETWORK

(71) Applicant: Spectrum Optix Inc., Vancouver (CA)

(72) Inventors: Kevin Gordon, Edmonton (CA); Darcy Daugela, Edmonton (CA); Martin Humphreys, Sherwood Park (CA)

(73) Assignee: SPECTRUM OPTIX INC., Vancouver (CA)

( * ) Notice: Subject to any disclaimer, the term of this patent is extended or adjusted under 35 U.S.C. 154(b) by 0 days.

(21) Appl. No.: 17/354,926

(22) Filed: Jun. 22, 2021

(65) Prior Publication Data

US 2021/0392258 A1  Dec. 16, 2021

Related U.S. Application Data

(63) Continuation of application No. 16/570,537, filed on Sep. 13, 2019, now Pat. No. 11,076,103.

(60) Provisional application No. 62/844,496, filed on May 7, 2019, provisional application No. 62/730,799, filed on Sep. 13, 2018.

(51) Int. Cl.
  *G06T 5/00* (2006.01)
  *G06T 5/50* (2006.01)
  *H04N 23/68* (2023.01)
  *H04N 23/72* (2023.01)
  *G06F 18/214* (2023.01)
  *G06V 10/82* (2022.01)
  *H04N 23/741* (2023.01)

(52) U.S. Cl.
  CPC ............ *G06T 5/003* (2013.01); *G06F 18/214* (2023.01); *G06T 5/002* (2013.01); *G06T 5/50* (2013.01); *G06V 10/82* (2022.01); *H04N 23/683* (2023.01); *H04N 23/72* (2023.01); *G06T 2207/20081* (2013.01); *G06T 2207/20084* (2013.01); *G06T 2207/20182* (2013.01); *H04N 23/741* (2023.01)

(58) Field of Classification Search
  CPC ............ H04N 5/2352; H04N 5/23267; G06K 9/6256; G06T 5/002; G06T 5/50
  See application file for complete search history.

(56) References Cited

U.S. PATENT DOCUMENTS

| | | | | |
|---|---|---|---|---|
| 10,043,243 | B2* | 8/2018 | Matviychuk | G06F 18/21342 |
| 10,430,683 | B2* | 10/2019 | Liu | G06T 5/002 |
| 10,949,951 | B2* | 3/2021 | Tang | G06N 20/00 |
| 2003/0020826 | A1* | 1/2003 | Kehtarnavaz | H04N 9/735 348/362 |
| 2017/0302838 | A1* | 10/2017 | Yang | B64D 47/08 |

* cited by examiner

*Primary Examiner* — Ahmed A Berhan
(74) *Attorney, Agent, or Firm* — David R. Stevens; Stevens Law Group

(57) ABSTRACT

A method for image capture includes determining an exposure range and setting at least one camera parameter to capture an underexposed image outside the exposure range. The underexposed image is processed using a neural network to recover image details. Image defects due to camera or object motion blur can be reduced.

6 Claims, 11 Drawing Sheets

PHOTOGRAPHIC UNDEREXPOSURE CORRECTION USING A NEURAL NETWORK

RELATED APPLICATIONS

This application is a continuation of U.S. patent application Ser. No. 16/570,537, filed Sep. 13, 2019, which claims the benefit of U.S. Provisional Application Ser. No. 62/730,799, filed Sep. 13, 2018 and U.S. Provisional Application Ser. No. 62/844,496, filed May 7, 2019, all of which are hereby incorporated herein by reference in their entirety for all purposes.

TECHNICAL FIELD

The present disclosure relates to a system for enhancing underexposed photographic images using a convolutional neural network. In particular, a method reducing required open shutter time, reducing required aperture size, or lowering sensor sensitivity, with minimal loss in image quality, is described.

BACKGROUND

Low light environments often do not provide enough available light to properly expose a camera sensor and provide a usable image. Such low light pictures can be improved by increasing sensor light sensitivity, increasing aperture size, extending exposure time, or providing flash or other artificial lighting. Unfortunately, each of these solutions have well known problems. Increasing sensor sensitivity amplifies sensor noise. Aperture size increase can require large, heavy, and costly lenses. Extending exposure time can result in motion blur from camera shake, shearing artifacts in rolling shutter systems, and object motion blur. Flash lighting can be expensive, difficult to deploy, and often results in unnatural appearing overexposure of people or objects.

A variety of computer processing techniques have been applied to improve appearance of low light images. For example, simple techniques such as histogram equalization and gamma correction can often increase brightness of dark regions with limited effect on bright regions. Denoising and deblurring can be used to respectively reduce noise and motion artifacts. Picture level analysis and processing, using for example the inverse dark channel prior for image dehazing, wavelet transform processing, or illumination map estimation, can all improve low light images.

Various attempts have also been made to salvage unsatisfactory or poorly shot low light camera images using machine intelligence post-processing. For example, a paper by Chen Chen, Qifeng Chen, Jia Xu, Vladlen Koltun, "Learning to See in the Dark" Published at the Conference on Computer Vision and Pattern Recognition (CVPR 2018), arXiv:1805.01934 [cs.CV] (4 May 2018), describes the use of a fully convolutional neural network for direct single image processing of low light images.

For a more complex machine intelligence processing example, a paper by Yuki Endo, Yoshihiro Kanamori, and Jun Mitani, "Deep Reverse Tone Mapping," ACM Transactions on Graphics (Proc. of SIGGRAPH ASIA 2017), 36, 6, Article 177 (November 2017), describes the use of low dynamic range images that are over or underexposed and processed using a neural network to synthesize a natural appearing high dynamic range image. Similarly, Xin Yang et al., describes in "Image Correction via Deep Reciprocating HDR Transformation", arXiv:1804.04371 [cs.CV], published 12 Apr. 2018, camera underexposure/overexposure correction with a dual neural network system to reconstruct poorly exposed images.

SUMMARY

A method for image capture includes determining an exposure range and setting at least one camera parameter to capture an underexposed image outside the exposure range. The underexposed image is processed using a neural network to recover image details. Image defects due to camera or object motion blur can be reduced.

Another embodiment is a method for image improvement that includes the steps of determining analog settings for a sensor system having a sensor and capturing data with the sensor. A neural network trained on previous data provided by the sensor can be used to reduce noise and recover image details from the captured image data.

In one embodiment, analog settings are adjusted to improve neural network training response.

In one embodiment, analog settings are adjusted to underexpose an image.

In one embodiment, an image is compressed after processing with the neural network.

In one embodiment, a system for improving total system gain in combined analog and digital systems includes a sensor system having a sensor configured to capture image data, with the image data processed in a sequential analog and digital procedure. A neural network can be trained on previous data provided by the sensor or sensor type to reduce noise and recover image details from the captured image data after analog amplification. In some embodiments, neural network processing can occur before digital amplification, or alternatively can occur after analog amplification and some digital amplification.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified.

DETAILED DESCRIPTION

All image sensing systems and sensors will have some associated noise that is created during typical operation. In noisy environments such as is common in low light environments (e.g. low environment lux, fast shutter, or small aperture) this noise will become a dominant portion of the digitized signal. Unfortunately, many traditional and modern computer vision algorithms (i.e. object or facial identification, visual odometry, visual SLAM, or image stabilization) can fail in high noise environments. Algorithms and systems that reduce image noise and recover image details are needed to enable these algorithms to work in environments where they would typically fail.

Reducing noise can also benefit machine intelligence based processing of images. Modern learning based algorithms work exceptionally well for those data distribution sets for which they have been trained on. When machine learning algorithms are presented with data outside this distribution, or when using adversarial examples, accuracy, speed, and other performance measures of these algorithms can suffer. If image sensor noise in images or data sets can be greatly reduced, learning algorithms processing the images or data sets will be subject to a lesser performance degradation.

Still another problem with noise is a result of noise being a high entropy information that is nearly incompressible. This means that compression ratios for a given system or sensor storage media will be greatly reduced for images capturing noisy environments or conditions. Compressed file sizes will typically end as much larger than the equivalent signal captured under normal operating conditions.

To reduce noise, improve image accuracy and detail recovery in normal or low light conditions, and improve compression ratios, a neural network can be used to recover the underlying signal. In effect, media preprocessed with a system and neural network such as disclosed herein can be improved in image quality and compressed to a greater degree, resulting in smaller file sizes, and reduced storage or bandwidth usage. Advantageously, even correctly exposed images benefit from this preprocessing step.

Figure 1:
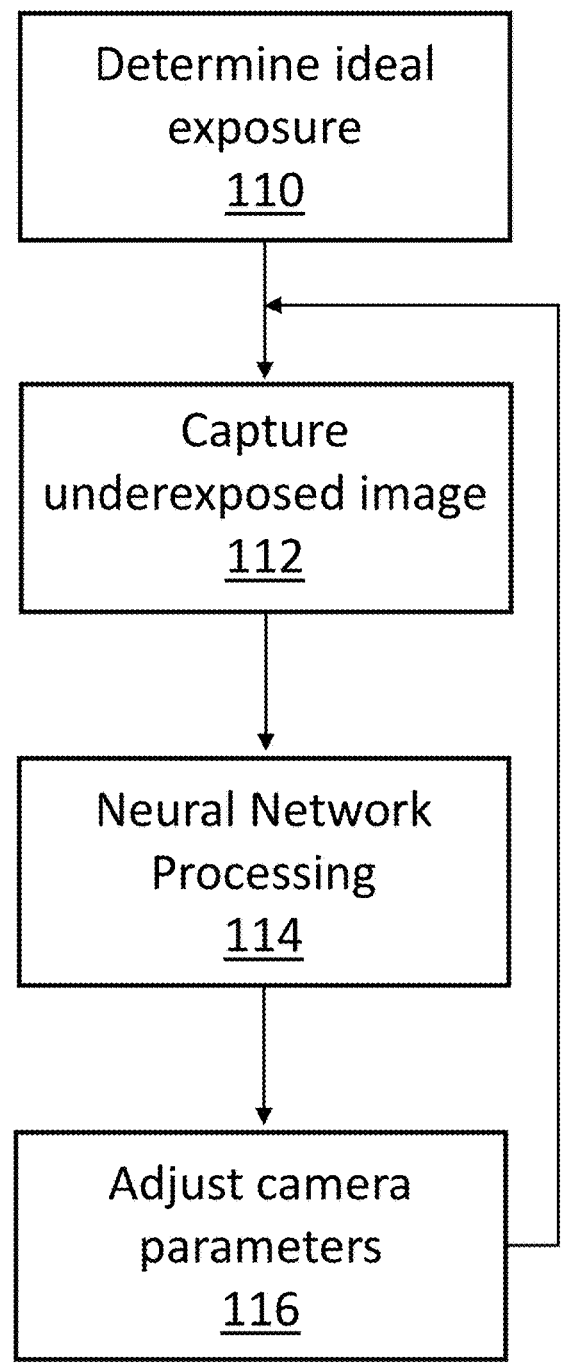
FIG. 1 illustrates a method for improving camera image capture functionality.

As seen in FIG. 1, in one embodiment a system and method 100 for improving camera image capture low light capability and reducing noise using neural network processing relies on first determining an ideal exposure or range of exposures (step 110). In a second step 112, at least one purposely underexposed image is captured. In a third step 114, this image is processed using neural network or other machine intelligence system to improve overall system quality. Finally, in step 116, based on actual or estimated image quality, other camera operations can have functional parameters adjusted. For example, low ISO settings can be used instead of high ISO setting traditionally associated with low light conditions. As another example, in video applications, frame rates can be increased.

A wide range of still or video cameras can benefit from use of system and method 100. Camera types can include but are not limited to conventional DSLRs with still or video capability, smartphone, tablet cameras, or laptop cameras, dedicated video cameras, webcams, or security cameras. In some embodiments, specialized cameras such as infrared cameras, thermal imagers, millimeter wave imaging systems, x-ray or other radiology imagers can be used. Embodiments can also include cameras with sensors capable of detecting infrared, ultraviolet, or other wavelengths to allow for hyperspectral image processing.

Cameras can be standalone, portable, or fixed systems. Typically, a camera includes processor, memory, image sensor, communication interfaces, camera optical and actuator system, and memory storage. The processor controls the overall operations of the camera, such as operating camera optical and sensor system, and available communication interfaces. The camera optical and sensor system controls the operations of the camera, such as exposure control for image captured at image sensor. Camera optical and sensor system may include a fixed lens system or an adjustable lens system (e.g., zoom and automatic focusing capabilities). Cameras can support memory storage systems such as removable memory cards, wired USB, or wireless data transfer systems.

In some embodiments, neural network processing can occur after transfer of image data to a remote computational resources, including a dedicated neural network processing system, laptop, PC, server, or cloud. In other embodiments, neural network processing can occur within the camera, using optimized software, neural processing chips, or dedicated FPGA systems.

In some embodiments, results of neural network processing can be used as an input to other machine learning or neural network systems, including those developed for object recognition, pattern recognition, face identification, image stabilization, robot or vehicle odometry and positioning, or tracking or targeting applications. Advantageously, such neural network processed image normalization can, for example, reduce computer vision algorithm failure in high noise environments, enabling these algorithms to work in environments where they would typically fail due to noise related reduction in feature confidence. Typically, this can include but is not limited to low light environments, foggy, dusty, or hazy environments, or environments subject to light flashing or light glare. In effect, image sensor noise is removed by neural network processing so that later learning algorithms have a reduced performance degradation.

In certain embodiments, multiple image sensors can collectively work in combination with the described neural network processing to enable wider operational and detection envelopes, with, for example, sensors having different light sensitivity working together to provide high dynamic range images. In other embodiments, a chain of optical or algorithmic imaging systems with separate neural network processing nodes can be coupled together. In still other embodiments, training of neural network systems can be decoupled from the imaging system as a whole, operating as embedded components associated with particular imagers.

Exposure can be defined as a function of the number of photons collected at a sensor's electron wells and the sensor's quantum efficiency. The number of photons collected is primarily affected by the scene lighting, the aperture of the optical path, and the exposure time. Well-exposedness has been defined as being close to the middle of the range of an analog to digital signal. Determining a particular exposure or range of exposures can be done manually, semi-automatically with manual input, or automatically. Typically, exposure is determined by setting one or more of aperture, ISO, or shutter speed, but other modifications affecting exposure time such as neutral or polarizing filter insertion are also possible. Once an ideal or range of exposure settings is determined or set, the camera inputs (e.g. aperture, ISO, or shutter speed) are purposely adjusted to underexpose the image sensor. Underexposure can involve reducing aperture, decreasing ISO, or increasing shutter speed. Assuming other exposure related settings are maintained constant, an aperture-controlled underexposure would involve increasing the f-stop by two or more, an ISO underexposure would be set to half or less of an ideal setting (e.g. ISO 3000 set to ISO 100), and shutter speed could be doubled or more (e.g. 1/60 second set to 1/1000 of a second). As will be appreciated, various combinations of these settings can be simultaneously adjusted.

Figure 2:
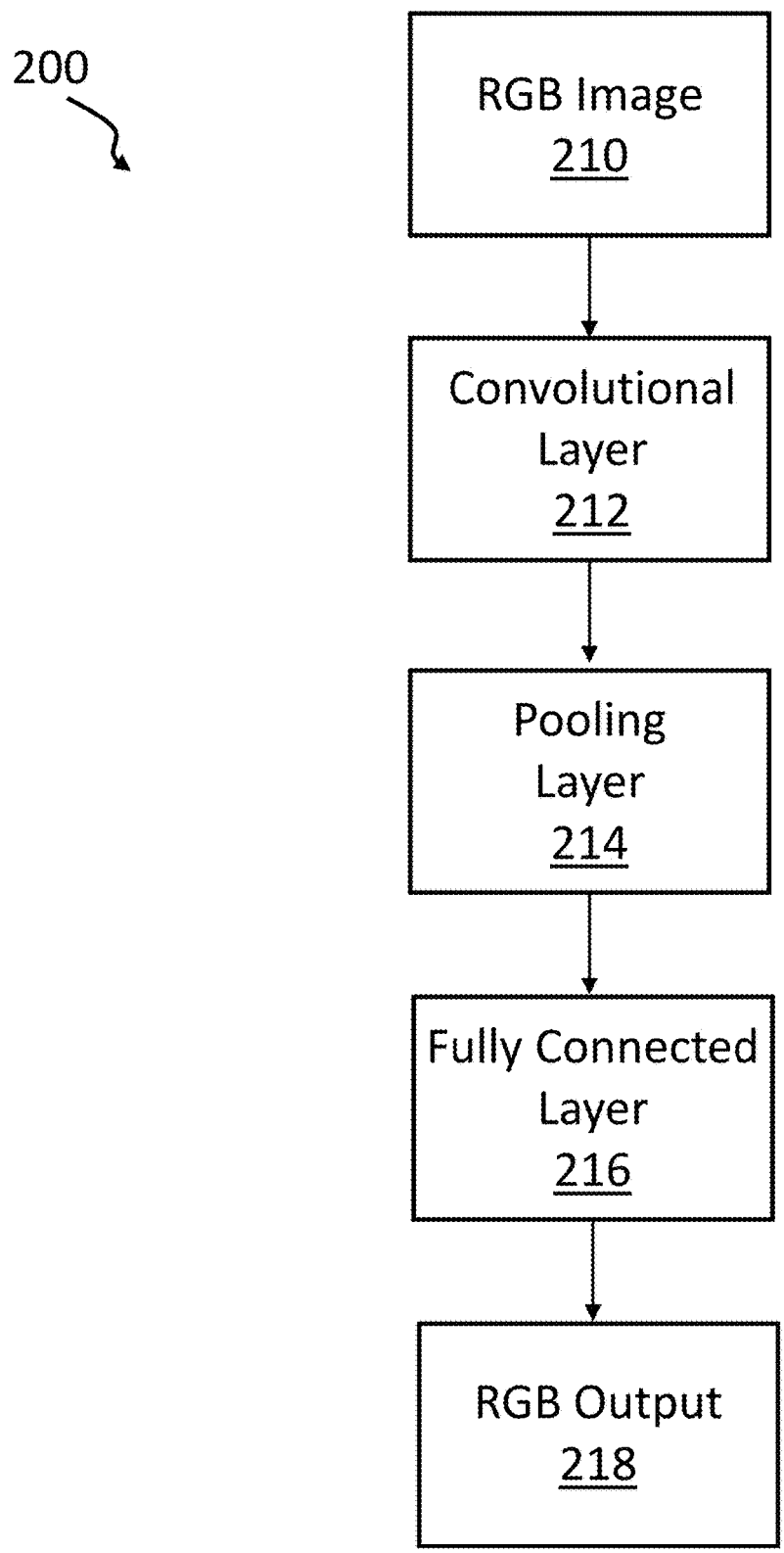
FIG. 2 illustrates neural network processing.

Various types of neural networks can be used, including recurrent, generative adversarial, or deep convolutional networks. Convolutional neural networks are particularly useful for image processing applications such as described herein. As seen with respect to FIG. 2, a convolutional neural network 200 can receive a single underexposed RGB image 210 as input. RAW formats are preferred, but compressed JPG images can be used with some loss of quality. Images can be pre-processed with conventional pixel operations or can preferably be fed with minimal modifications into a trained convolutional neural network 200.

Processing proceeds through one or more convolutional layers 212, pooling layer 214, a fully connected layer 216, and ends with RGB output 218 of the improved image. In operation, one or more convolutional layers apply a convolution operation to the RGB input, passing the result to the next layer(s). After convolution, local or global pooling layers can combine outputs into a single or small number of nodes in the next layer. Repeated convolutions, or convolution/pooling pairs are possible. Before output, the fully connected layer 216 connect every node in one layer to every node in another layer.

Figure 3:
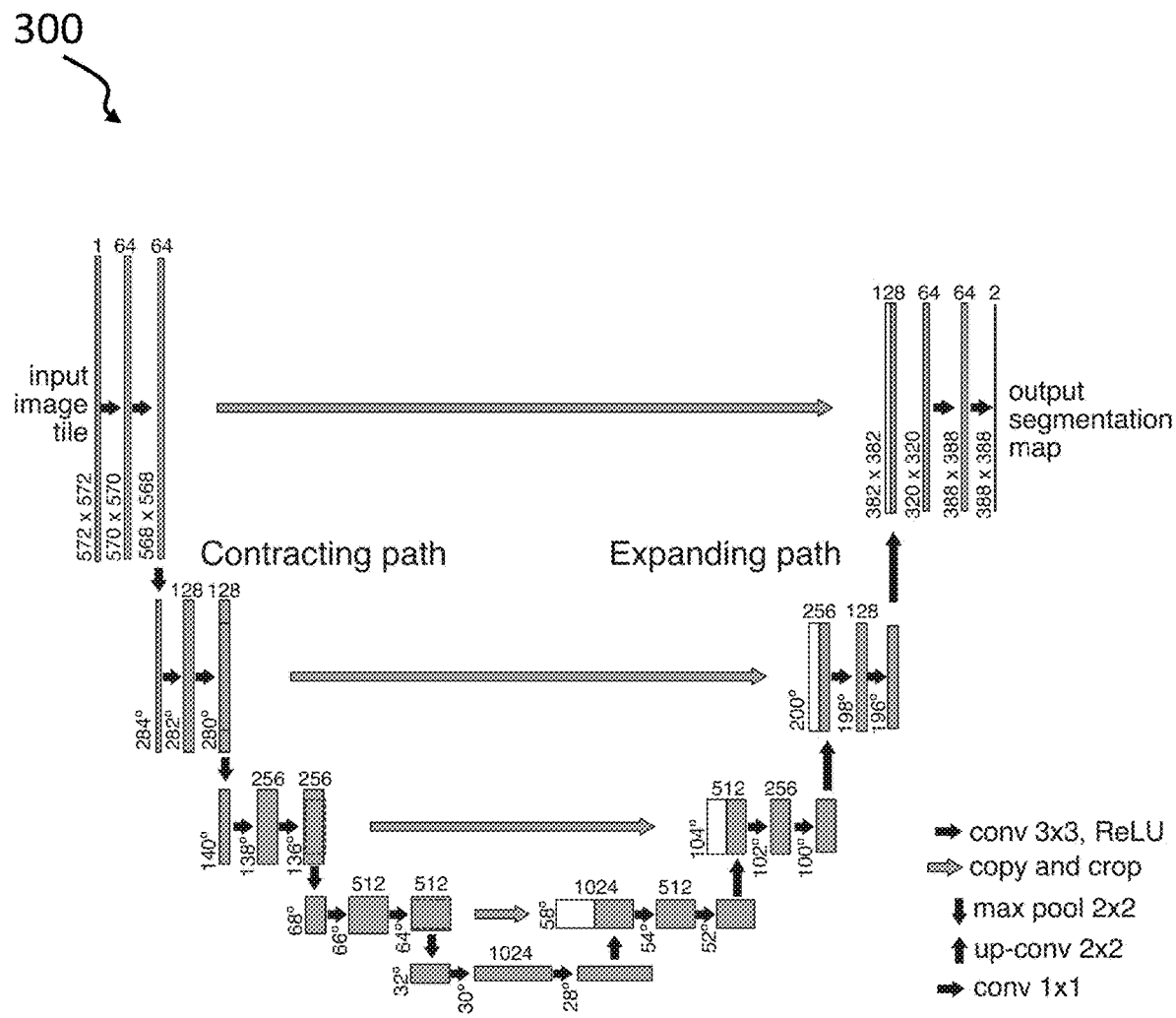
FIG. 3 illustrates another neural network processing embodiment.

One neural network embodiment of particular utility is a fully convolutional neural network. A fully convolutional neural network is composed of convolutional layers without any fully-connected layers usually found at the end of the network. Advantageously, fully convolutional neural networks are image size independent, with any size images being acceptable as input for training. An example of a fully convolutional network 300 is illustrated with respect to FIG. 3. Data can be processed on a contracting path that includes repeated application of two 3×3 convolutions (unpadded convolutions), each followed by a rectified linear unit (ReLU) and a 2×2 max pooling operation with stride 2 for down sampling. At each down sampling step, the number of feature channels is doubled. Every step in the expansive path consists of an up sampling of the feature map followed by a 2×2 convolution (up-convolution) that halves the number of feature channels, provides a concatenation with the correspondingly cropped feature map from the contracting path, and includes two 3×3 convolutions, each followed by a ReLU. The feature map cropping compensates for loss of border pixels in every convolution. At the final layer a 1×1 convolution is used to map each 64-component feature vector to the desired number of classes. While the described network has 23 convolutional layers, more or less convolutional layers can be used in other embodiments. Training can include processing input images with corresponding segmentation maps using stochastic gradient descent techniques.

Figure 4A:
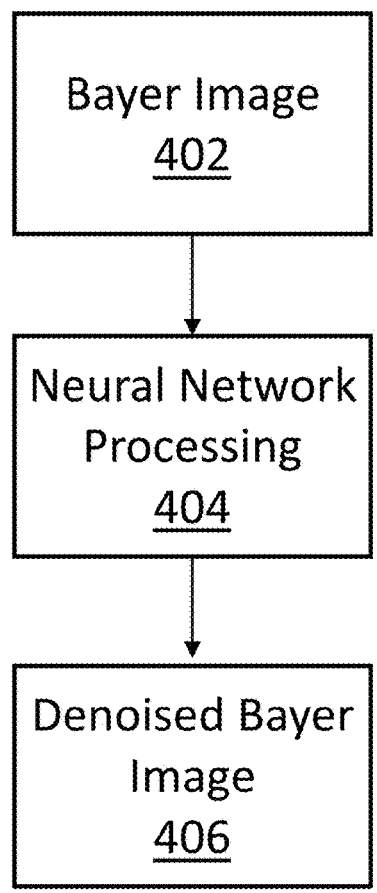
FIGS. 4A-D illustrate selected neural network denoising of data sets.

Other embodiments of systems and methods that rely on neural network processing can also be employed. As seen with respect to FIG. 4A, a procedure 400 involves use Bayer image data 402 that can be specific to particular sensors or types of sensors. Neural network processing 404 is used to denoise the data 402 and provide a denoised Bayer image 406. As will be understood, training and operation of the neural network processing can also be specific to particular sensors or types of sensors used to create data 402.

Figure 4B:
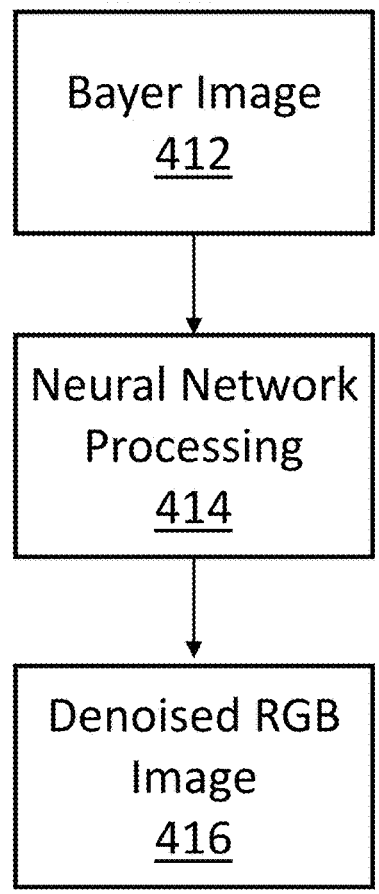

In another embodiment seen with respect to FIG. 4B, a procedure 410 involves use Bayer image data 412 that can be specific to particular sensors or types of sensors. Neural network processing 414 is used to denoise the data 412 and provide a denoised RGB image 416. As will be understood, training and operation of the neural network processing can also be specific to particular sensors or types of sensors used to create data 402.

Figure 4C:
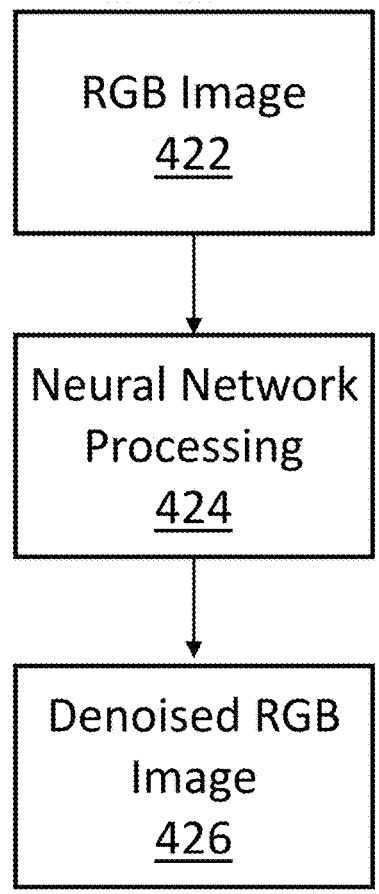

In another embodiment seen with respect to FIG. 4C, a procedure 420 involves use RGB image data 422 that can be specific to particular sensors or types of sensors. Neural network processing 424 is used to denoise the data 422 and provide a denoised RGB image 426. As will be understood, training and operation of the neural network processing can also be specific to particular sensors or types of sensors used to create data 422.

Figure 4D:
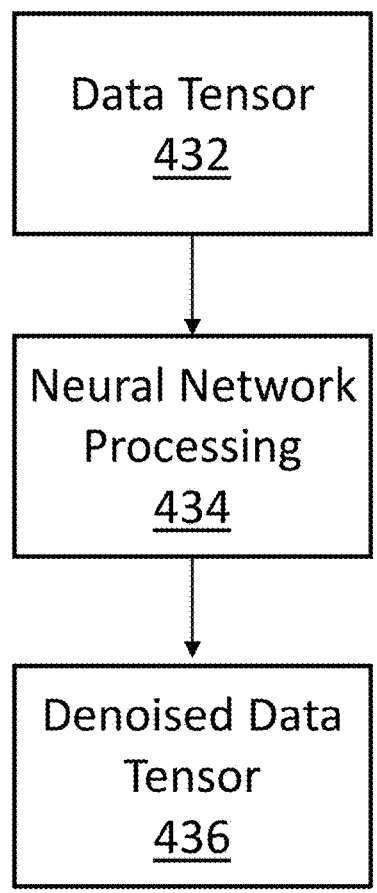

In another embodiment seen with respect to FIG. 4D, a procedure 430 involves use tensor data 432 that can be specific to particular sensors or types of sensors. Neural network processing 434 is used to denoise the data 432 and provide a denoised tensor data 436. As will be understood, training and operation of the neural network processing can also be specific to particular sensors or types of sensors used to create data 432. In some embodiments, non-optical sensors or systems, including millimeter radar systems, mapping pressure sensors, or other suitable sensors providing tensor data sets can be used.

Figure 5:
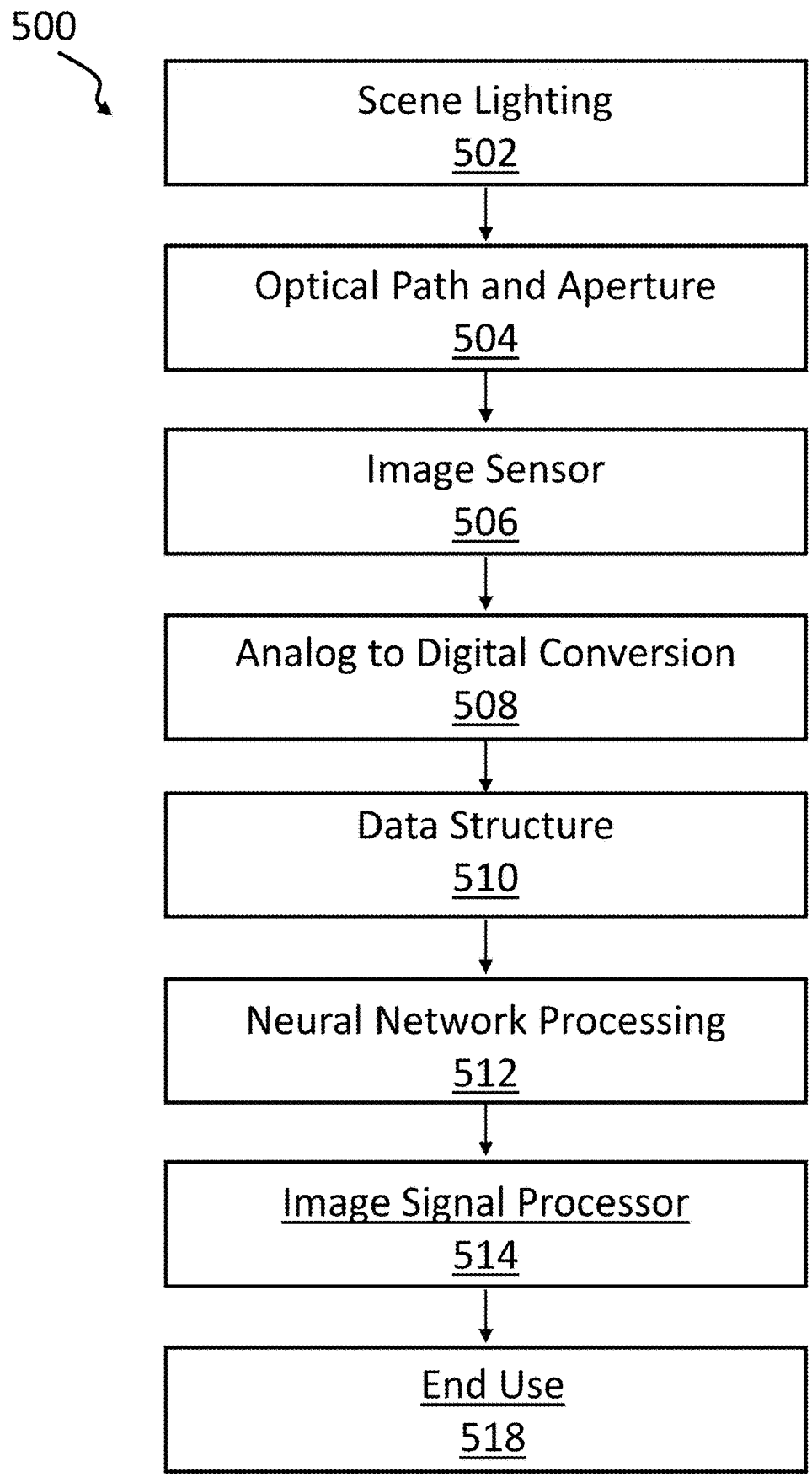
FIG. 5 illustrates on embodiment of a camera sensor processing procedure.

FIG. 5 illustrates one embodiment of an imaging pipeline 500 for improving image data. Factors that affect analog processing of an image include scene lighting 502, optical path and aperture 504, and features of an image sensor 506. Many of these factors can be automatically adjusted or adjusted to favor factors that will improve efficacy of later neural network processing. For example, flash or other scene lighting can be increased in intensity, duration, or redirected. Filters can be removed from an optical path, apertures opened wider, or shutter speed decreased. Image sensor efficiency or amplification can be adjusted by ISO selection.

In one embodiment, low light images can be captured by increasing one or more of these analog factors prior to analog to digital conversion. Noise or other unwanted artifacts can be removed by later neural network processing 512 after analog to digital conversion 508 and conversion into a suitable data structure 510 such as Bayer derived, RGB, RAW, TIFF, JPG, or the like. For example, a Bayer derived data structure could be defined to stack the color channels depthwise, such that the resulting dimensions are halved spatially and quadrupled depthwise Image signal processing using an image signal processor 514 can include additional digital scaling, tone mapping, pixel correction, demosaicing, dehazing, or the like. In some embodiments, neural network processing can run on the image signal processor 514, while in others a separate processing component can be used. A processed image can be stored, transferred, displayed, classified, encoded, or provided for any other suitable intermediate or end use 518.

Figure 6:
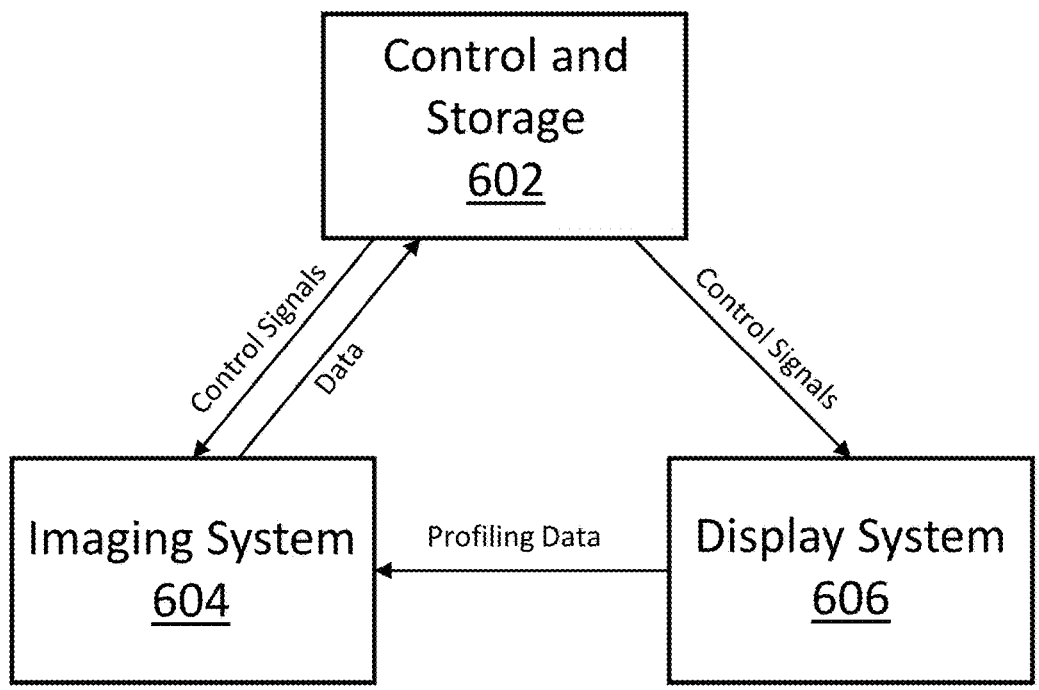
FIG. 6 illustrates a system with control, imaging, and display sub-systems.

FIG. 6 illustrates a system 600 for training neural networks that includes a control and storage module 602 able to send respective control signals to an imaging system 604 and a display system 606. The imaging system 604 can supply processed image data to the control and storage module 602, while also receiving profiling data from the display system 606.

Training neural networks in a supervised or semi-supervised way requires high quality training data. To obtain such data, a system 600 provides automated imaging system profiling. The control and storage module 602 contains calibration and raw profiling data to be transmitted to the display system 606. Calibration data may contain, but is not limited to, targets for assessing resolution, focus, or dynamic range. Raw profiling data may contain, but is not limited to, natural and manmade scenes captured from a high quality imaging system (a reference system), and procedurally generated scenes (mathematically derived).

An example of a display system 606 is a high quality electronic display. The display can have its brightness adjusted or may be augmented with physical filtering elements such as neutral density filters. An alternative display system might comprise high quality reference prints or filtering elements, either to be used with front or back lit light sources. In any case, the purpose of the display system is to produce a variety of images, or sequence of images, to be transmitted to the imaging system.

The imaging system being profiled is integrated into the profiling system such that it can be programmatically controlled by the control and storage computer and can image the output of the display system. Camera parameters, such as aperture, exposure time, and analog gain, are varied and multiple exposures of a single displayed image are taken. The resulting exposures are transmitted to the control and storage computer and retained for training purposes.

The entire system is placed in a controlled lighting environment, such that the photon "noise floor" is known during profiling.

The entire system is setup such that the limiting resolution factor is the imaging system. This is achieved with mathematical models which take into account parameters, including but not limited to: imaging system sensor pixel pitch, display system pixel dimensions, imaging system focal length, imaging system working f-number, number of sensor pixels (horizontal and vertical), number of display system pixels (vertical and horizontal). In effect a particular sensor, sensor make or type, or class of sensors can be profiled to produce high-quality training data precisely tailored to an individual sensors or sensor models.

Figure 7:
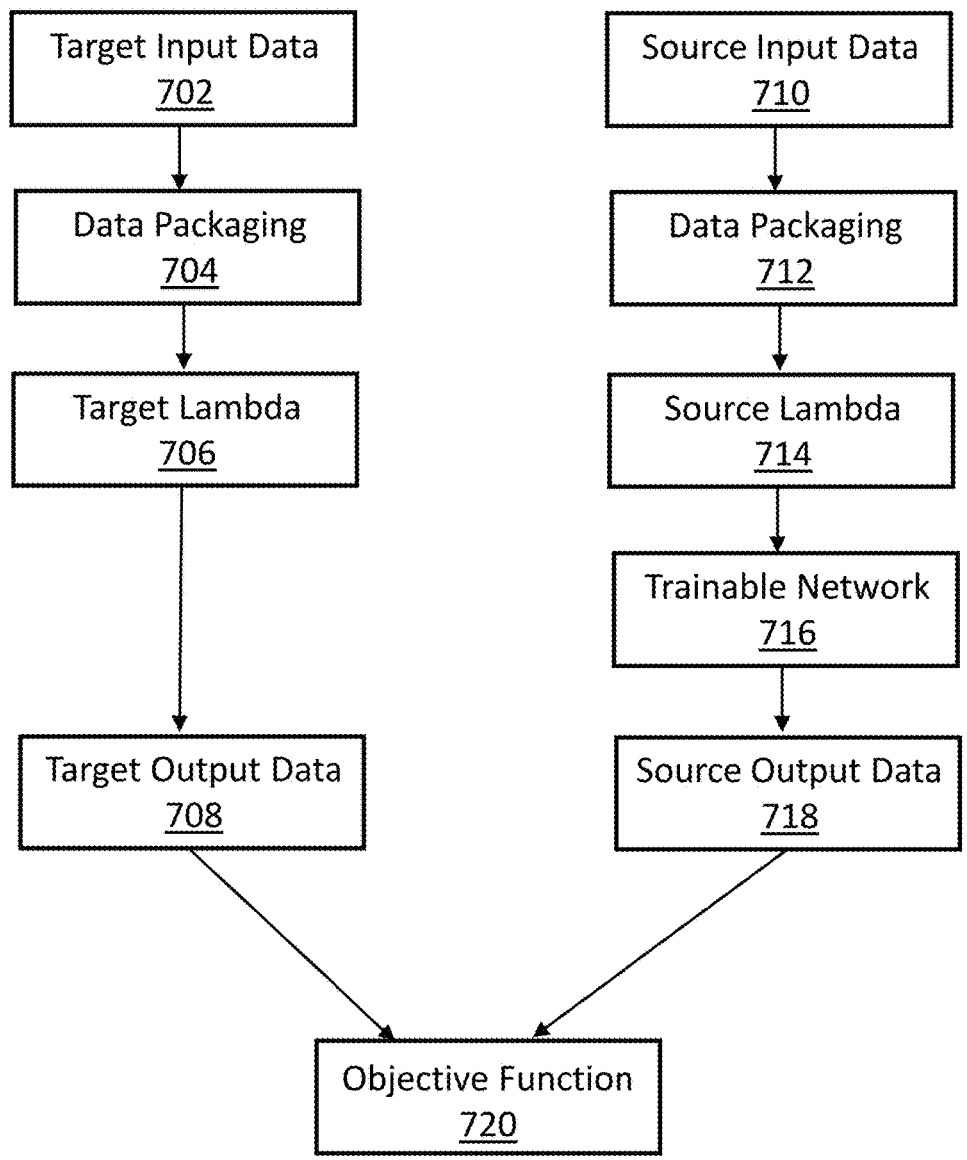
FIG. 7 illustrates one embodiment of a neural network training procedure.

FIG. 7 illustrates one embodiment of a neural network system 700 whose parameters can be manipulated such that they produce desirable outputs for a set of inputs and are capable of improving imaging quality for noisy or low light image data such as previously described. One such way of manipulating a network's parameters is by "supervised training". In supervised training, the operator provides source/target pairs 710 and 702 to the network and, when combined with an objective function, can modify some or all the parameters in the network system 700 according to some scheme (e.g. backpropagation).

In the described embodiment of FIG. 7, high quality training data (source 710 and target 702 pairs) from various sources such as a profiling system, mathematical models and publicly available datasets, are prepared for input to the network system 700. The method includes data packaging target 704 and source 712, and preprocessing lambda target 706 and source 714.

Data packaging takes one or many training data sample(s), normalizes it according to a determined scheme, and arranges the data for input to the network in a tensor. Training data sample may comprise sequence or temporal data.

Preprocessing lambda allows the operator to modify the source input or target data prior to input to the neural network or objective function. This could be to augment the data, to reject tensors according to some scheme, to add synthetic noise to the tensor, to perform warps and deformation to the data for alignment purposes or convert from image data to data labels.

The network 716 being trained has at least one input and output 718, though in practice it is found that multiple outputs, each with its own objective function, can have synergetic effects. For example, though the overall objective of the system is to reduce image noise, noise reduction performance can be improved through a "classifier head" output whose objective is to classify objects in the tensor. Target output data 708, source output data 718, and objective function 720 together define a network's loss to be minimized, the value of which can be improved by additional training or data set processing.

Figure 8:
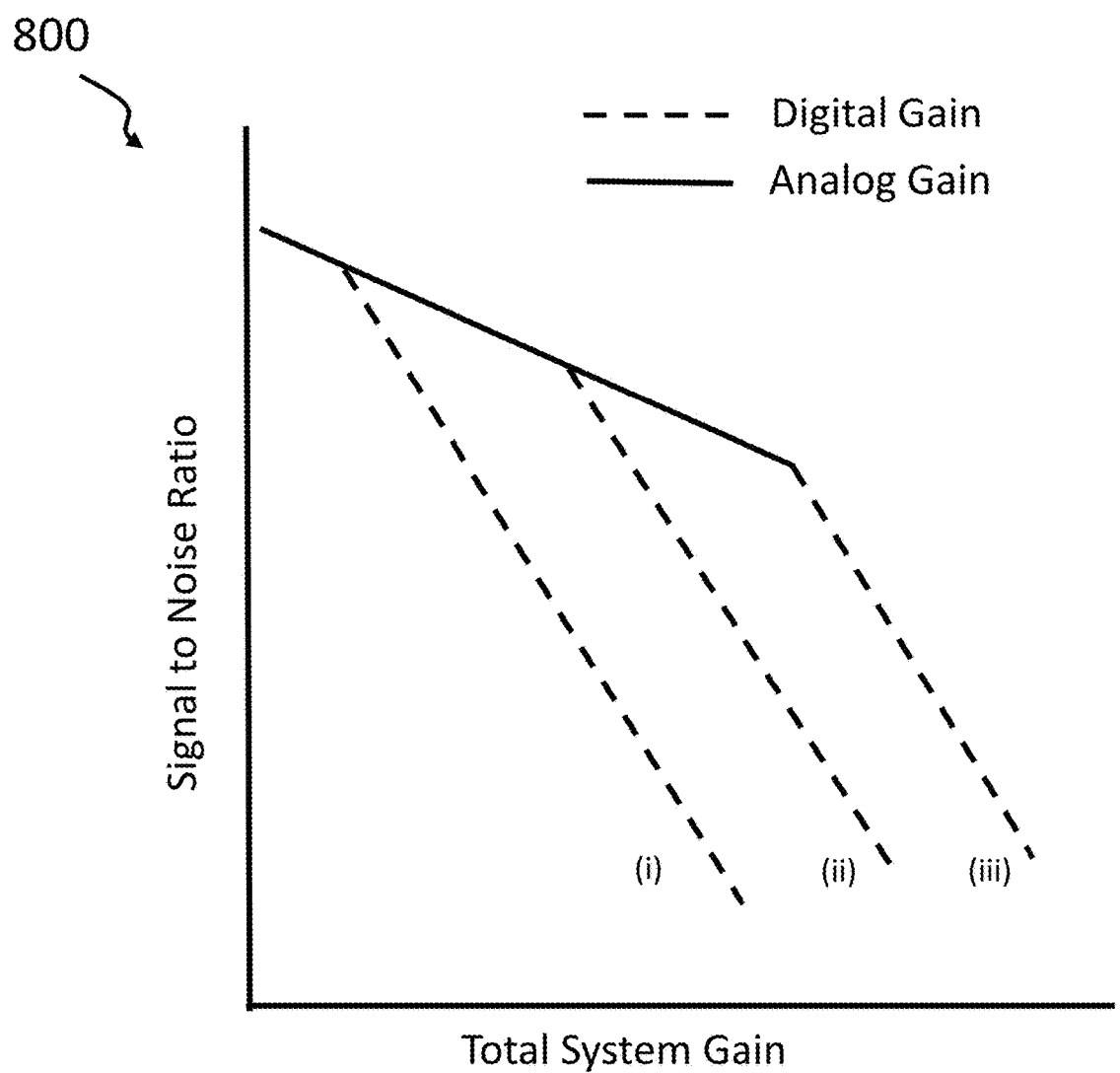
FIG. 8 is a graph illustrating signal to noise ratio versus total system gain for an embodiment.

FIG. 8 is a graph 800 illustrating signal to noise ratio versus total system gain for an embodiment. As will be apparent from the graph 800, total system gain or amplification can be increased at the cost of increasing noise and decreasing the signal to noise ratio. Amplification of a signal can occur by analog amplification (or gain), or by digital amplification. In graph 800, three different instances i, ii, and iii of analog amplification followed by digital amplification are indicated. Instance i shows limited analog amplification followed by digital amplification. Instance ii illustrates an increase in analog amplification, while instance iii shows digital amplification only an even greater increase in analog amplification. The best total system gain is provided by maximizing achievable analog gain, and only then providing digital gain. This supports one embodiment of the present disclosure, in which total system gain is improved by first increasing or maximizing analog gain, followed by neural network processing and then digital gain improvements The described method and system can provide various benefits for many applications, including:

Motion or object blur reduction—motion blur is caused by the motion of the camera or target object during the time the shutter is open. Using the described method, the shutter opening time can be significantly reduced.

Long range image capture—movement of the camera during the time the shutter is open reduces image quality. For long range or handheld camera imaging, blur caused by camera motion is a key limiter. Using the described method, the long range imaging camera motion blur can be significantly reduced, or applications requiring a heavy tripod mount can be converted to stabilization using a light tripod, electronically, optically, or gyroscopically stabilized camera systems, or use of a handheld camera.

Frame rate increase—short exposure time permits faster frame rates. Faster frame rates enable "slow motion" (fast frame rate) imaging with smaller devices and apertures.

Burst mode capture—more multiple images can be captured in succession. This can be used to reduce issues with camera or object movement faced by stacked high dynamic range imagery.

Super Image Stabilization—fast exposure times, combined with fast frame rates, enables super image stabilization. Super image stabilization is a computational technique to stabilize a set of images. Each pixel in the image is mapped to a representation of a target scene and various computational techniques enable an increase in effective resolution.

Increased Dynamic Range Imaging—dynamic range of the images can be increased because underexposure reduces pixel saturation problems. This application is particularly useful for outdoor or high brightness contrast imaging.

Light level reduction—underexposure allows for a decrease in flash brightness levels and flash duration.

Radiation reduction—underexposure allows duration of directed X-ray or millimeter wave radiation levels to be reduced.

File Compression—noise is high entropy information and can be regarded as purely incompressible. A given sensor will have some noise, and in low light environments (low environment lux, fast shutter, small aperture) this noise will become a dominant portion of the digitized signal. In this case, compression ratios for a given media will begin to suffer with the resultant compressed file size being larger than the equivalent signal captured under normal operating conditions. However, since the described neural network processing recovers the underlying signal, noise is reduced and overall signal to noise ratios are improved. In effect, neural network processed data can be compressed to greater degree, resulting in smaller file sizes and/or reduced bandwidth usage. Advantageously, file size compression is found to occur even for normally exposed images (not just low light images) and is of particular advantage for photos with large expanses of similarly colored regions such as clouds or sky.

As will be understood, the camera system and methods described herein can operate locally or in via connections to either a wired or wireless connect subsystem for interaction with devices such as servers, desktop computers, laptops, tablets, or smart phones. Data and control signals can be received, generated, or transported between varieties of external data sources, including wireless networks, personal area networks, cellular networks, the Internet, or cloud mediated data sources. In addition, sources of local data (e.g. a hard drive, solid state drive, flash memory, or any other suitable memory, including dynamic memory, such as SRAM or DRAM) that can allow for local data storage of user-specified preferences or protocols. In one particular embodiment, multiple communication systems can be provided. For example, a direct Wi-Fi connection (802.11b/g/n) can be used as well as a separate 4G cellular connection.

Connection to remote server embodiments may also be implemented in cloud computing environments. Cloud computing may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims. It is also understood that other embodiments of this invention may be practiced in the absence of an element/step not specifically disclosed herein.

The invention claimed is:

1. A method for image noise reduction, comprising:
   capturing with a camera an image having noise;
   processing the image using a first neural network to produce denoised tensor data and reduce noise captured within the image; and
   passing the denoised tensor data and noise reduced image to a second neural network that provides at least one of object recognition, pattern recognition, face identification, image stabilization, robot or vehicle odometry and positioning, or tracking or targeting applications.

2. The method of claim 1, wherein both the first neural network and the second neural network processing is completed by the camera.

3. The method of claim 1, wherein the first neural network processing is completed by the camera.

4. The method of claim 1, wherein the denoised tensor data and noise reduced image reduce image file size.

5. The method of claim 1, wherein the camera is a video camera.

6. The method of claim 1, wherein the camera records non-optical images.

* * * * *